Patented Nov. 20, 1934

1,981,635

UNITED STATES PATENT OFFICE 1,981,635

FOAM REDUCTION

Richard G. Clarkson, Wilmington, Del., assignor to E. I. du Pont de Nemours & Company, Wilmington, Del., a corporation of Delaware No Drawing. Application November 3, 1931, Serial No. 572,879

7 Claims. (Cl. 252—6)

This invention relates to means for abating or decreasing foaming tendency of liquids and more particularly to chemical processes in which aqueous liquids of strong foaming power are agitated without the formation of undesirable stable foam.

It has previously been proposed to prevent the foaming of aqueous liquids by the addition thereto of such substances as phenyl ether and turpentine solutions of resin. Neither of these materials has been as active or as efficient as would ordinarly be desired in the art.

In a United States patent to Roger Williams, No. 1,820,417, there is disclosed a process for synthesizing liquid organic compounds, including methanol and its homologues. The process in general involves the catalytic hydrogenation of oxides of carbon under elevated pressure. There are numerous other references in the patent literature citing similar methods for the production of these compounds by hydrogenation of carbon oxides. The organic compounds produced by such methods have a boiling range up to approximately 210° C. It has been found that the fraction of this resultant product which boils above approximately 133° C. is efficient for the prevention of foaming of aqueous liquids. This particular fraction is an exceedingly complex mixture which defies complete analysis but is known to contain ketones and normal, primary and secondary and iso- primary, secondary and tertiary alcohols containing 6–10 carbon atoms.

This invention has for an object the provision of a substance which will greatly decrease or entirely eliminate foaming of aqueous liquids. Other objects are the provision of improved chemical processes, the provision of an easily prepared and readily available anti-foaming or foam-abating agent and in general an advancement in the art. Other objects will appear hereinafter.

The objects of this invention are accomplished by treating a liquid which foams or has a tendency to foam with a mixture of liquid organic compounds, boiling within the range of 133–210° C., obtained by the catalytic hydrogenation of carbon oxides under high pressure. The mixture of organic compounds may be added to the liquid before, during or after the formation of the foam.

There is at present no generally accepted method for testing the qualities of an anti-foaming agent and there are no absolute units upon which to base the properties of any given antifoaming agent. The method used in the test described in this application is empirical and was entirely arbitrary. Since comparisons with known substances were made, absolute values were not necessary to show the success of the invention. The method used by applicant consisted in agitating with an electrically driven stirrer of the type commonly used for mixing malted milk, 150 cc. of a 1% water solution of sodium di-isopropyl naphthalene sulphonate in a 400 cc. beaker. The body of liquid was agitated with the high speed stirrer for two minutes, the stirring stopped and the time required for complete subsidence of the foam at the center of the beaker taken. The amount of substance used as an anti-foaming agent was arbitrarily taken as 0.50% by weight of the liquid treated. Some of the values obtained are given in Table I which follows:

Table I

| Agent | Time | |
|---|---|---|
| | Minutes | Seconds |
| None | Somewhat less than 30 | |
| Mixture of liquid organic compounds obtained from the hydrogenation of carbon oxides | | 25 |
| Diphenyl ether | 5 | |
| 20% resin in turpentine | 3 | |
| Quinoline | | 48 |
| Aniline | 1 | 22 |
| Limonene | 2 | |
| Kerosene | Somewhat less than 30 | |

Very desirable results are obtained when a mixture of liquid organic compounds of the type herein described is mixed with substances which are inactive and the resultant product is used as an anti-foaming agent. Thus, such mixtures with kerosene when tested in accordance with the method previously described gave especially desirable results, as indicated by Table II, following:

Table II

| Percent kerosene | Percent liquid organic compound mixture | Time | |
|---|---|---|---|
| | | Minutes | Seconds |
| 100 | 0 | Somewhat less than 30 | |
| 80 | 20 | 9 | |
| 60 | 40 | 3 | 30 |
| 40 | 60 | 1 | 10 |
| 20 | 80 | | 38 |
| 0 | 100 | | 26 |

Generally speaking, in practicing my invention, I prefer to effect the reduction of foaming in liquids by adding thereto a mixture of liquid organic compounds, produced by the catalytic hydrogenation of carbon oxides under high pressure and boiling within the range of about 160–210° C. The mixture of liquid organic compounds employed in the above described tests conformed approximately to this preferred embodiment of the invention.

The amount of anti-foam material to be used in any particular process can not be definitely defined because of the variance of such factors as surface tension of the solution, the superficial area exposed, the temperature and the violence of the agitation. In general, an amount of antifoaming agent less than 1% by weight of the body of liquid treated is sufficient.

The invention has a wide variety of uses in chemical processes, particularly those wherein gas or vapor is evolved. Among such processes may be mentioned the neutralization of acid solutions with soda ash or calcium carbonate, the thermal decomposition of diazonium salt solutions, the manufacture of hydrochloric acid from salt and sulphuric acid, the carbonation of beet sugars, the evaporation of steep water in corn products manufacture, and steam distillations. Other applications of the invention are the reduction or elimination of foam in locomotive and marine boilers and in the paper industry to remove or lessen foam in the beaters.

Products produced in accordance with the present invention are readily available, are inexpensive and are particularly effective. Other advantages will be obvious to those skilled in the art.

As many apparent and widely different embodiments of this invention may be made without departing from the spirit and scope thereof, it is to be understood that I do not limit myself to the specific embodiments thereof except as defined by the appended claims.

I claim:

1. The process of decreasing foaming in aqueous liquids which comprises adding thereto a mixture of liquid organic compounds, boiling within the range of approximately 133–210° C., obtained by the hydrogenation of carbon oxide under high pressure.

2. The process of decreasing foaming in aqueous liquids which comprises adding thereto in amount corresponding to less than 1% by weight of the liquid treated, a mixture of liquid organic compounds, boiling within the range of approximately 133–210° C., obtained by the hydrogenation of carbon oxide under high pressure.

3. The process of decreasing foaming in aqueous liquids which comprises adding thereto a mixture of liquid organic compounds, boiling within the range of approximately 160–210° C., obtained by the hydrogenation of carbon oxide under high pressure.

4. The process set forth in claim 1, wherein a miscible diluent is present in the mixture of liquid organic compounds.

5. The process set forth in claim 1, wherein kerosene is present in the mixture of liquid organic compounds, and is added with them to the aqueous liquids.

6. As an antifoaming agent, a mixture of liquid organic compounds, boiling within the range of 133–210° C., obtained by the hydrogenation of carbon oxide under high pressure, and a liquid diluent which is miscible with the organic compounds, the resulting mixture being adapted to inhibit foaming upon being added to aqueous liquids.

7. As an antifoam agent, a mixture of liquid organic compounds, boiling within the range of 133–210° C., obtained by the hydrogenation of carbon oxide under high pressure, and kerosene, the resulting mixture being adapted to inhibit foaming upon being added to aqueous liquids.

RICHARD G. CLARKSON.